United States Patent Office 3,539,406
Patented Nov. 10, 1970

3,539,406
ESSENTIALLY NONAQUEOUS EMULSIONS
Kenneth J. Lissant, St. Louis, Mo., assignor to Petrolite Corporation, Wilmington, Del., a corporation of Delaware
No Drawing. Continuation-in-part of applications Ser. No. 286,877, May 20, 1963; Ser. No. 302,001 and Ser. No. 302,177, both Aug. 14, 1963; Ser. No. 411,103, Nov. 13, 1964; Ser. No. 541,738, Apr. 11, 1966; Ser. No. 547,581, May 4, 1966; Ser. No. 565,702, July 18, 1966; and Ser. No. 599,332, Oct. 19, 1966. This application May 10, 1967, Ser. No. 637,332
Int. Cl. C06d 5/00
U.S. Cl. 149—109                     9 Claims

ABSTRACT OF THE DISCLOSURE

An essentially nonaqueous, thixotropic emulsion of (1) an emulsifiable oil and (2) a nonoily, nonaqueous material, the emulsion containing in the internal phase at least 80% oil by volume of the total emulsions; methods of preparing the emulsion; and uses therefor, particularly as fuels, including their use as a source of power in engines normally capable of burning the oil phase, such as in jet, rocket, diesel, etc., engines including fuel injection engines, such as in internal combustion engines, for example employed in landcraft, watercraft, aircraft, etc.

---

This application is a continuation-in-part of the following copending patent applications: Ser. No. 286,877, May 20, 1963, Stable Emulsions, now abandoned; Ser. No. 302,001, Aug. 14, 1963, Hybrid Fuels II, now U.S. Pat. No. 3,396,537, granted on Aug. 13, 1968; Ser. No. 302,177, Aug. 14, 1963, Hybrid Fuels I, now abandoned; Ser. No. 541,738, Apr. 11, 1966, Method of Resolving Thixotropic Jet and Rocket Emulsions, now U.S. Pat. No. 3,328,418, granted on Apr. 16, 1968; Ser. No. 547,581, May 4, 1966, Hybrid Fuels I, now Pat. No. 3,352,109, granted on Nov. 14, 1967, continuation of Ser. No. 302,177; Ser. No. 565,702, July 18, 1966, Improved Thixotropic Emulsions; Ser. No. 599,332, Oct. 19, 1966, Stable Emulsions, continuation-in-part of S.N. 286,877, and now abandoned; Ser. No. 411,103, Nov. 13, 1964, Emulsions Preparation, now abandoned.

These applications which are by reference incorporated into the present application relate to stable, viscous, thixotropic emulsions and to the uses, preparation, etc., of these emulsions. These applications describe emulsions containing emulsified oily and nonoily phases with particular emphasis on aqueous emulsions.

The present invention relates to stable, viscous, thixotropic emulsions of the type described in these applications, with the further proviso that the nonoily phase be essentially nonaqueous.

Where water is employed in emulsions, it may create certain problems. For example, water is noncombustible, fosters problems in corrosion and bacterial action, has a relatively high freezing point which is often troublesome under conditions of use, etc. Although these problems may be alleviated by employing various additives such as antifreeze, anticorrosive, antibacterial additives, etc., the use of such additives may be eliminated and/or reduced by omitting essentially all water. Whereas nonoily, essentially nonaqueous emulsions are also disclosed in the above patent applications, the present application relates to specific embodiments of such nonaqueous emulsions.

Thus, the present invention relates to essentially nonaqueous high internal phase emulsions; to emulsified fuels such as rocket and jet fuels, diesel fuels, turbine fuels, internal combusion engine fuels, etc., and to the uses thereof. More particularly this invention relates to such fuels having the characteristics of both liquid and solid fuels (i.e., they are hybrid solid-liquid fuels). Still more particularly this invention relates to essentially nonaqueous hybrid solid-liquid fuels which are especially prepared, high internal phase, emulsions of one combustible material and a second combustible and/or volatile material which is immiscible in said first combustible material, said emulsion being prepared by means of an emulsifying agent which is capable of forming an emulsion having the characteristics of a solid fuel when at rest and a liquid fuel when force is exerted on it, such as by the shear of pumping, mixing, etc. This invention also relates to said hybrid fuels containing certain finely divided solids suspended therein, such as for example, metals, salts, etc.

Among other things, it has been found that when liquid fuels are subjected to crashes or military action or exposed to firearms or other means of ignition under fire power, serious fires and explosions often result. However, when emulsified fuels are subjected to crashes or to firearms or other fire power, the danger from serious fires and explosions is substantially reduced or eliminated. This is true of storage tanks, aircraft and jets, helicopters, land vehicles, water vehicles, etc.

The term "oily phase," as herein employed, is intended to include a vast number of substances, both natural and artificial, possessing widely different physical properties and chemical structures. All of the substances included within this term are practically insoluble in water, and in the nonoily phase employed possess a characteristic greasy touch and have a low surface tension. These include the animal oils of both land and sea animals; vegetable oils, both drying and nondrying; petroleum or mineral oils of various classes, including those of open chain hydrocarbons, cyclic hydrocarbons or cycloparaffins, with or without the presence of solid paraffins and asphalts and various complex compounds, and which may or may not contain sulphur or nitrogenous bodies; resin oils and wood distillates including the distillates of turpentine, rosin spirits, pine oil, and acetone oil; various oils, obtained from petroleum products, such as gasolines, naphthas, gas fuel, lubricating and heavier oils; coal distillate, including benzene, toluene, xylene, solvent naphtha, cresote oil and anthracene oil and ethereal oils.

Furthermore, the presence of the usual amounts of antiknock compounds or other conventional fuel additives in the oil does not adversely affect the usefulness of the oil for our purposes.

The choice of oily phase materials is not limited to hydrocarbons since synthetic esters, natural esters, and the like may be employed in the preparation of useful emulsions. Tung oil, oiticica oil, castor oil, linseed oil, poppyseed oil, soyabean oil, animal and vegetable oils such as cottonseed oil, corn oil, fish oils, walnut oils, pineseed oils, olive oil, coconut oil, degras, and the like, may also be used.

Practically, the choice of a liquid hydrocarbon for use in jet and rocket engine is based largely on availability and cost, and on this basis a petroleum hydrocarbon in the gasoline-kerosene range is the preferred material. Generally either liquid oxygen or fuming nitric acid is used with it as the oxidizer. Whenever the latter is used, practically all of the nitrogen in the acid, under proper burning conditions, appears in the combustion products as nitrogen gas. Aliphatic hydrocarbons from petroleum (gasoline, kerosene) are the cheapest and most abundant liquid fuels for rockets. The simpler aromatic hydrocarbons (benzene, toluene) are also abundant, have higher densities, and in general give more thermal energy per pound on combustion so that they produce somewhat more thrust per pound of fuel. Aliphatic hydrocarbons, from the standpoint of structure and heat of combustion, could be expected not to differ appreciably one from another in the energy they could contribute to a jet motor. Unsaturated hydrocarbons which are endothermic (that is, which have negative heats of formation) will, of course, liberate this heat during combustion and contribute to higher exhaust velocities. The highest calculated value of specific impulse for a hydrocarbon burned with oxygen is for diacetylene, HC≡CC≡CH, which gives 271 pound-seconds per pound. This is the highest that can be expected from any carbonaceous fuel burned with liquid oxygen at 300 p.s.i.a. A more usual value (that for normal octane) is about 240 pound-seconds per pound.

The nonoily, nonaqueous phase employed herein is one which possesses a cohesive energy density number in excess of about 10, whereas hydrocarbons typically possess values of less than about 10.

Cohesive energy density is the quotient of the molar heat of vaporization and the molar volume. The cohesive energy density (C.E.D.) is the amount of energy necessary to separate one ml. of liquid into its molecules. Conversely, the C.E.D. is the energy which holds 1 ml. of liquid together.

The following compounds have a C.E.D. number of about 10 or greater.

The C.E.D. number is defined as $\sqrt{C.E.D.}$ and is usually employed in comparisons and calculations.

The following is a list of compounds having a C.E.D. number of about 10 or greater. In general, there should be sufficient difference in the C.E.D. numbers of each phase to make a suitable emulsion.

| Description | C.E.D. No. |
|---|---|
| N,N-diethyl acetamide | 9.92 |
| 1,4-dioxane | 9.95 |
| Acetone | 10.0 |
| Carbon disulfide | 10.0 |
| Dioxane | 10.0 |
| Ethylamine | 10.0 |
| Nitrobenzene | 10.0 |
| Propionic anhydride | 10.0 |
| Acetic acid | 10.1 |
| t-Butyl alcohol | 10.1 |
| Methyl formate | 10.1 |
| Polymethyl chloroacrylate | 10.1 |
| m-Cresol | 10.2 |
| Cyclohexanol | 10.2 |
| Methyl formate | 10.2 |
| Methyl iodide | 10.2 |
| Propionitrile | 10.2 |
| Pyridine | 10.2 |
| Acetaldehyde | 10.3 |
| Aniline | 10.3 |
| Carbon disulfide | 10.3 |
| Isobutyric acid | 10.3 |
| Methylene chloride | 10.3 |
| n-Octyl alcohol | 10.3 |
| sec-Butyl alcohol | 10.4 |
| Cyclopentanone | 10.4 |
| 1,2-dibromomethane | 10.4 |
| Methyl formate | 10.4 |
| Acrylonitrile | 10.5 |
| Bromoform | 10.5 |
| n-Butyric acid | 10.5 |
| Tris(dimethylamido)phosphate | 10.5 |
| Isobutyl alcohol | 10.5 |
| Cellulose dinitrate | 10.56 |
| Acetic anhydride | 10.6 |
| tert-Butyl alcohol | 10.6 |
| N,N-diethylformamide | 10.6 |
| n-Heptyl alcohol | 10.6 |
| Propionitrile | 10.6 |
| n-Butyl alcohol | 10.7 |
| n-Hexyl alcohol | 10.7 |
| Polyglycol terephthalate | 10.7 |
| Polymethacrylonitrile | 10.7 |
| Pyridine | 10.7 |
| Benzyl alcohol | 10.8 |
| N,N-dimethylacetamide | 10.8 |
| Amyl alcohol | 10.9 |
| Cellulose diacetate | 10.9 |
| N-acetylpiperidine | 11.0 |
| Dichloroacetic acid | 11.0 |
| Ethyl cyanoacetate | 11.0 |
| Di-methyl malonate | 11.0 |
| Cyclobutanedione | 11.1 |
| Dimethyl oxalate | 11.1 |
| Ethyl oxide | 11.1 |
| Furfural | 11.2 |
| Methyl amine | 11.2 |
| Dipropyl sulphone | 11.3 |
| N-acetylpyrrolidine | 11.4 |
| n-Butanol | 11.4 |
| NNN'N'-tetramethyloxamide | 11.4 |
| Bromine | 11.5 |
| N-formylpiperidine | 11.5 |
| Isopropanol | 11.5 |
| N-acetylmorpholine | 11.6 |
| Acetonitrile | 11.7 |
| Allyl alcohol | 11.8 |
| Methylene iodide | 11.8 |
| Acetonitrile | 11.9 |
| N-propyl alcohol | 11.9 |
| 2:3-butylene carbonate | 12.0 |
| Acetonitrile | 12.1 |
| Dimethyl formamide | 12.1 |
| Dimethyltetramethylene sulphone | 12.1 |
| Formic acid | 12.1 |
| Hydrogen cyanide | 12.1 |
| Ethylene chlorhydrin | 12.2 |
| Methylene glycollate | 12.4 |
| Nitromethane | 12.4 |
| Diethyl sulphone | 12.5 |
| Dimethyl phosphite | 12.5 |
| Methyl propyl sulphone | 12.5 |
| Chloroacetonitrile | 12.6 |
| Osmium tetroxide | 12.6 |
| ε-Caprolactam | 12.7 |
| Ethyl alcohol | 12.7 |
| Nitro methane | 12.7 |
| β-Methyltetramethylene sulphone | 12.9 |
| N-formylmorpholine | 13.0 |
| N,N-dimethylnitroamine | 13.1 |
| Butyrolactone | 13.3 |
| Propiolactone | 13.3 |
| 1:2-propylene carbonate | 13.3 |
| Methyl ethyl sulphone | 13.4 |
| γ-Pyrone | 13.4 |
| Maleic anhydride | 13.6 |
| γ-Piperidone | 13.6 |
| Dimethyl sulfoxide | 13.9 |
| Methyl alcohol | 14.3 |
| Tetramethylene sulphone | 14.3 |
| EtOH | 14.4 |
| Methanol | 14.4 |
| Dimethyl sulphone | 14.6 |
| Ethylene glycol | 14.6 |
| Ethylene carbonate | 14.7 |
| γ-Pyrrolidone | 14.7 |
| Polyacrylonitrile | 14.8–15.2 |
| Malonylnitrile | 15.1 |
| Succinic anhydride | 15.4 |
| Ammonia | 16.3 |
| Water | 24.2 |

In general, in addition, the nonoily, nonaqueous phase possesses the following characteristics:

(1) Is liquid over the range of use.

(2) Is essentially immiscible with the internal phase and/or is capable of forming a distinct separate phase.

(3) Is capable of dissolving the emulsifier so as to concentrate it at the liquid interfaces to prevent coalescence of the internal phase.

(4) Is itself a solvating agent, or contains a solvating agent or mixture of solvating agents, for the emulsifier.

Thus, the nonoily, nonaqueous phase contains one or more nonoily materials and an emulsifier dissolved therein, said nonoily phase being essentially insoluble in the oily phase and said emulsifier being capable of preparing and maintaining a stable, viscous, thixotropic or pseudoplastic emulsion.

Stated another way, the nonoily phase may be looked upon as having two functions:

(1) Is essentially immiscible in the oily phase and/or is capable of forming a distinct separate phase.

(2) Is itself a solvent for the emulsifier, or containing a solvent capable of dissolving the emulsifier so as to concentrate the emulsifier at the interface to prevent coalescence of the internal phase.

The nonoily phase may be of (1) the polar protic type as illustrated by: Alcohols, e.g., methanol, ethanol, propanol, etc. Glycols, e.g., ethylene glycol, propylene glycol, etc. Polyglycols, e.g., $H(OA)_nH$ where A is alkylene and $n$ is an integer, for example 1–10 or greater, for example diethyleneglycol, triethyleneglycol, dipropyleneglycol, tripropyleneglycol, etc., polyalcohols, aldehydes, polyaldehydes, etc.; and (2) of the polar aprotic type as illustrated by N-alkylcarboxylamides such as N,N-dialkylcarboxylamides such as N,N-dimethylformamide, N,N-dimethyl acetamide, N,N-diethylformamide, N,N-diethylacetamide, etc., and closely related compounds such as formamide, N-methyl formamide, N,N-dimethyl methoxy acetamide, etc.

Other illustrative solvents are dimethyl sulfoxide, dimethyl sulfone, N-methyl-2-pyrrolidone, tetramethylurea, pyridine, hexamethyl phosphoramide, tetramethylene sulfone, butyrolactone, nitroalkanes such as nitromethanes, nitroethanes, etc.

Mixtures of a variety of polar aprotic solvents can also be employed, as well as polar aprotic solvents in combination with polar protic solvents.

In general, the techniques described in the above applications can be employed in preparing the nonaqueous emulsions of this invention. These emulsions are prepared by employing any suitable emulsifying agent. Although oxyalkylates are preferred, other types of suitable emulsifiers can also be employed including the anionic, cationic, nonionic and ampholytic demulsifiers.

By using the means of selecting suitable emulsifiers described in the patent applications referred to herein, one can select and employ emulsifiers, for example, of the following types:

(I) ANIONIC (A) Carboxylic acids:
  (1) Carboxyl joined directly to the hydrophobic group (subclassification on basis of the hydrophobic group, e.g., fatty acids, soaps, rosin soaps, etc.
  (2) Carboxyl joined through an intermediate linkage.
    (a) Amide group as intermediate link.
    (b) Ester group as intermediate link.
    (c) Sulfoamide group as intermediate link.
    (d) Miscellaneous intermediate links, ether, $-SO_2-$, $-S-$, etc.
(B) Sulfuric esters (sulfates):
  (1) Sulfate joined directly to hydrophobic group.
    (a) Hydrophobic group contains no other polar structures (sulfated alcohol and sulfated olefin type).
    (b) Sulfuric esters with hydrophobic groups containing other polar structures (sulfated oil type).
  (2) Sulfate group joined through intermediate linkage,
    (a) Ester linkage (Artic Syntex M. type).
    (b) Amide linkage (Xynomine type).
    (c) Ether linkage (Triton 770 type).
    (d) Miscellaneous linkages (eg., oxyalkylimidazole sulfates.
(C) Alkane sulfonic acids:
  (1) Sulfonic group directly linked.
    (a) Hydrophobic group bears other polar substituents ("highly sulfated oil" type). Chloro, hydroxy, acetoxy, and olefin sulfonic acids (Nytron type).
    (b) Unsubstituted alkane sulfonic acids (MP 189 type: also cetane sulfo acid type).
    (c) Miscellaneous sulfonic acids of uncertain structure, e.g., oxidation products of sulfurized olefins, sulfonated rosin, etc.
  (2) Sulfonic groups joined through intermediate linkage.
    (a) Ester linkage.
      (1) $RCOO-X-SO_3H$ (Igepon AP type).
      (2) $ROOC-X-SO_3H$ (Aerosol and sulfoacetate type).
    (b) Amide linkage.
      (1) $RCONH-X-SO_3H$ (Igepon T type).
      (2) $RNHOC-X-SO_3H$ (sulfosuccinamide type).
    (c) Ether linkage (Triton 720 type).
    (d) Miscellaneous linkages and two or more linkages.
(D) Alkyl aromatic sulfonic acids:
  (1) Hydrophobic group joined directly to sulfonated aromatic nucleus (subclasses on basis of nature of hydrophobic group. Alkyl phenols, terpene, and rosin-aromatic condensates, alkyl aromatic ketones, etc.).
  (2) Hydrophobic group joined to sulfonated aromatic nucleus through an intermediate linkage.
    (a) Ester linkage (sulfophthalates, sulfobenzoates).
    (b) Amide and imide linkages.
      (1) $R-CONH-ArSO_3H$ type.
      (2) Sulfobenzamide type.
    (c) Ether linkage (alkyl phenyl ether type).
    (d) Heterocyclic linkage (Ultravon type, etc.).
    (e) Miscellaneous and two or more links.
(E) Miscellaneous anionic hydrophillic groups:
  (1) Phosphates and phosphonic acids.
  (2) Persulfates, thiosulfates, etc.
  (3) Sulfonamides.
  (4) Sulfamic acids, etc.

(II) CATIONIC (A) Amine salts (primary, secondary, and tertiary amines):
  (1) Amino group joined directly to hydrophobic group.
    (a) Aliphatic and aromatic amino groups.
    (b) Amino group is part of a heterocycle (alkaterge type).
  (2) Amino group joined through an intermediate link.
    (a) Ester link.
    (b) Amide link.
    (c) Ether link.
    (d) Miscellaneous links.
(B) Quaternary ammonium compounds:
  (1) Nitrogen joined directly to hydrophilic group.

(2) Nitrogen joined through an intermediate link.
  (a) Ester link.
  (b) Amide link.
  (c) Ether link.
  (d) Miscellaneous links.
(C) Other nitrogenous bases:
  (1) Nonquaternary bases (classified as guanidine, thiuronium salts, etc.).
  (2) Quaternary bases.
(D) Non-nitrogenous bases.
  (1) Phosphonium compounds.
  (2) Sulfonium compounds, etc.

(III) NONIONIC (A) Ether linkage to solubilizing groups.
(B) Ester linkage.
(C) Amide linkage.
(D) Miscellaneous linkages.
(E) Multiple linkages.

(IV) AMPHOLYTIC (A) Amino and carboxy:
  (1) Nonquaternary.
  (2) Quaternary.
(B) Amino and sulfuric ester:
  (1) Nonquaternary.
  (2) Quaternary.
(C) Amine and alkane sulfonic acid.
(D) Amine and aromatic sulfonic acid.
(E) Miscellaneous combinations of basic and acidic groups.

Although any suitable emulsifier can be employed, the emulsifiers most usually employed in the practice of this invention are generally known as oxyalkylated surfactants or more specifically polyalkylene ether or polyoxyalkylene surfactants. Oxyalkylated surfactants as a class are well known. The possible subclasses and specific species are legion. The methods employed for the preparation of such oxyalkylated surfactants are also too well known to require much elaboration. Most of these surfactants contain, in at least one place in the molecule and often in several places, an alkanol or a polyglycolether chain. These are most commonly derived by reacting a starting molecule, possessing one or more oxyalkylatable reactive groups, with an alkylene oxide such as ethylene oxide, propylene oxide, butylene oxide, or higher oxides, epichlorohydrin, etc. However, they may be obtained by other methods such as shown in U.S. Pats. 2,588,771 and 2,596,091–3, or by esterification or amidification with an oxyalkylated material, etc. Mixtures of oxides may be used as well as successive additions of the same or different oxides may be employed. Any oxyalkylatable material may be employed. As typical starting materials may be mentioned alkyl phenols, phenolic resins, alcohols, glycols, amines, organic acids, carbohydrates, mercaptans, and partial esters of polybasic acids. In general, if the starting material is water or nonoily soluble, it my be converted into an oil-soluble surfactant by the addition of polypropoxy or polybutoxy chains. If the starting material is oil-soluble, it may be converted into a water or nonoily soluble surfactant by the addition of polyethoxy chains. Subsequent additions of ethoxy units to the chain tend to increase the water or nonoily solubility, while subsequent additions of high alkoxy chains tend to increase the oil solubility. In general, the final solubility and surfactant properties are a result of a balance between the oil-soluble and water or nonoily soluble portions of the molecule.

In the practice of this invention it has been found that emulsifiers suitable for the preparation of high internal phase ratio emulsions may be prepared from a wide variety of starting materials. For instance, if one begins with an oil-soluble material such as a phenol or a long chain fatty alcohol and prepares a series of products by reaction with successive portions of ethylene oxide, one finds that the members of the series are successively more water or nonoily soluble. One finds also that somewhere in the series there will be a limited range where the products are useful for the practice of this invention. Similarly it is possible to start with water or a water or nonoily soluble material such as polyethylene glycol and add, successively, portions of propylene oxide. The members of this series will be progressively less water-soluble and more oil-soluble. Again there will be a limited range where the materials are useful for the practice of this invention.

In general, the compounds which would be selected for testing as to their suitability are oxyalkylated surfactants of the general formula $$Z[(OR)_nOH]_m$$

wherein Z is the oxyalkylatable material, R is the radical derived from the alkylene oxide which can be, for example, ethylene, propylene, butylene, epichlorohydrin and the like, $n$ is a number determined by the moles of alkylene oxide reacted, for example 1 to 2000 or more and $m$ is a whole number detremined by the number of reactive oxyalkylatable groups. Where only one group is oxyalkylatable as in the case of a monofunctional phenol or alcohol R'OH, then $m=1$. Where Z is water, or a glycol, $m=2$. Where Z is glycerol, $m=3$, etc.

In certain cases, it is advantageous to react alkylene oxides with the oxyalkylatable material in a random fashion so as to form a random copolymer on the oxyalkylene chain, i.e. the $[(OR)_nOH]_m$ chain such as —AABAAABBABABBABBA— 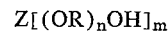

In addition, the alkylene oxides can be reacted in an alternate fashion to form block copolymers on the chain, for example —BBBAAABBBAAAABBBB— or 

—BBBBAAACCCAAAABBBB— 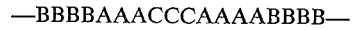

where A is the unit derived from one alkylene oxide, for example ethylene oxide, and B is the unit derived from a second alkylene oxide, for example propylene oxide, and C is the unit derived from a third alkylene oxide, for example, butylene oxide, etc. Thus, these compounds include terpolymers or higher copolymers polymerized randomly or in a block-wise fashion or many variations of sequential additions.

Thus, $(OR)_n$ in the above formula can be written $—A_aB_bC_c—$ or any variation thereof, where $a$, $b$ and $c$ are zero or a number provided that at least one of them is greater than zero.

It cannot be overemphasized that the nature of the oxyalkylatable starting material used in the preparation of the emulsifier is not critical. Any species of such material can be employed. By proper additions of alkylene oxides, this starting material can be rendered suitable as an emulsifier and its suitability can be evaluated by plotting the oxyalkyl content of said surfactant versus its performance, based on the ratio of the oil to water which can be satisfactorily incorporated into water as a stable emulsion. By means of such a testing system any oxyalkylated material can be evaluated and its proper oxyalkylation content determined.

As is quite evident, new oxyalkylated materials or other emulsifiers will be constantly developed which could be useful in preparing these emulsions. It is therefore not only impossible to attempt a comprehensive catalogue of such compositions but to attempt to describe the invention in its broader aspects in terms of specific chemical names of the components used would be too voluminous and unnecessary since one skilled in the art could by following the testing procedures described herein select the proper components. This invention lies in the use of suitable emulsifiers in preparing the compositions of this invention and their individual composition is important only in the sense that their properties can effect these emulsions. To precisely define each specific surfactant useful as an emulsifier in light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduct with confidence the applicability of emulsifiers suitable for this invention by means of the evaluation tests set forth herein. In analogy to the case of a machine wherein the use of certain materials of construction or dimensions of parts would lead to no practical useful result, various materials will be rejected as inapplicable where others would be operative. One can obviously assume that no one will wish to make a useless composition or will be misled because it is possible to misapply the teachings of the present disclosure in order to do so. Thus, any emulsifier that can perform the function stated herein can be employed.

REPRESENTATIVE EXAMPLES OF Z

| No. | As the base oxyalkylated material— |
|---|---|
| 1 | 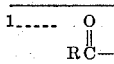 |
| 2 | 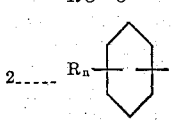 |
| 3 | R—O— |
| 4 | R—S— |
| 5 | 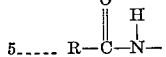 |
| 6 | 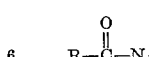 |
| 7 | 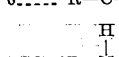 |
| 8 | R N< |
| 9 | Phenol-aldehyde resins. |
| 10 | —O—(Ex: Alkylene oxide block polymer). |
| 11 | 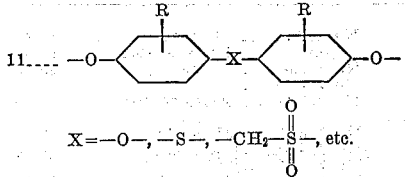 |
| | X=—O—, —S—, —CH$_2$—S—, etc. |
| 12 | 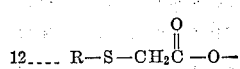 |
| 13 | R P O$_4$ H— |
| 14 | R P O$_4$< |
| 15 | P O$_4$≡ |
| 16 | 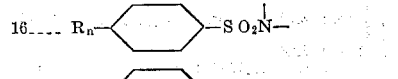 |
| 17 | 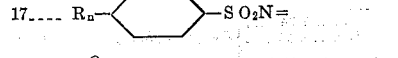 |
| 18 | 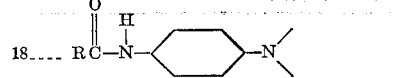 |
| 19 | Polyol-derived (Ex: glycerol, glucose, pentaerithrytol). |
| 20 | Anhydrohexitan or anhydrohexide derived (spans and tweens). |
| 21 | Polycarboxylic derived. |
| 22 | 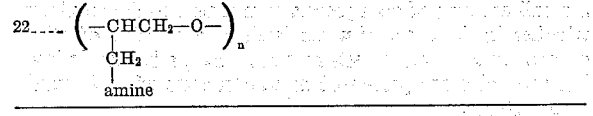 |

Examples of oxyalkylatable materials derived from the above radicals are legion and these, as well as other oxyalkylatable materials, are known to the art. A good source of such oxyalkylatable materials, as well as others, can be found in "Surface Active Agents and Detergents," vol. 1 and 2, by Schwartz, et al., Interscience Publishers (vol. 1, 1949, vol. 2, 1958) and the patents and references referred to therein.

In general, the base oxyalkylatable material is tested for solubility in water or the particular nonoily material employed or toluene, or any other suitable oily material. If it is water or nonoily soluble it is oxyalkylated with propylene or butylene oxide until it is just oil soluble, with representative samples being collected as its oxyalkylate content is increased. If the oxyalkylatable material is oil-soluble, then it is oxyalkylated with ethylene oxide until it is just water or nonoily soluble, with representative samples being collected as its oxypropylation or oxybutylation content is increased. These samples are similarly tested. This procedure can thereupon be repeated with another alkylene oxide until opposite solubility is achieved, i.e., if the material is water or nonoily soluble it is oxypropylated or oxybutylated until it is oil-soluble. If the prior oxypropylated or oxybutylated material is oil-soluble, it is treated with ethylene oxide until it is water or nonoily soluble. This can be repeated in stages each time changing the material to one of opposite solubility by using a hydrophile oxide (i.e., EtO) for an oil-soluble material and a hydrophobe oxide (i.e., PrO or BuO) for water solubility. The same procedure and tests are employed at each stage, proceeding each time to oxyalkylation to opposite solubility.

Although the amount of oxyalkylated material present in the emulsion is generally 0.05–5 volume percent, such as 0.1 to 4%, but preferably 0.2–3%, larger amounts can also be employed if desired. However, economics generally restrict the amount employed to the ranges indicated.

The exact range which is useful for the practice of this invention will vary with the starting emulsifier base and the sequence of alkylene oxides used to achieve the polyalkylene ether chains. It should also be noted that materials useful in the practice of this invention can be made by other well-known methods besides oxyalkylation such as the esterification of a polyalkylene ether alcohol, reaction of carboxylic acids with oxyalkylated amines, etc. Thus, the term "oxyalkylated" includes any means of attaching the oxyalkyl group to a molecule. Any method of attaching oxyalkyl groups to a molecule can be employed.

It has also been found that the optimum range of effectiveness for any particular emulsifier series will vary with the particular oil phase and also with the composition of the nonoily phase which is employed.

To illustrate the variety of materials that may be used as emulsifiers in the practice of this invention the following examples are presented. It should be noted that these examples are simply illustrative and should not be construed as imposing limitations on the scope of the invention.

EMULSIFIER NO. 1

This emulsifier was prepared in the same manner as Examples 9–21 of application Ser. No. 302,177, filed Aug. 14, 1963 except that mixed alkylphenol having 15 to 20 carbons in the alkyl group was oxyalkylated with 3.80 parts by weight of ethylene oxide.

The final product was a waxy brown solid at room temperature.

EMULSIFIER NO. 2

This emulsifier was prepared in the manner of Example 1 of Ser. No. 302,177 by oxyalkylating one part by weight of n-decanol and with 1.96 parts by weight of propylene oxide followed by 2.61 parts by weight of ethylene oxide.

EMULSIFIER NO. 3

This emulsifier was prepared in the manner of Example 34 of Ser. No. 302,177 by reacting one part of p-tertiarybutyl phenol with 15.40 parts by weight of propylene oxide followed by 30.16 parts by weight of ethylene oxide to yield a white waxy solid.

EMULSIFIER NO. 4

This emulsifier was prepared in the manner of Ser. No. 302,177, Examples 9–21, except that one part by weight of dinonyl phenol was oxyalkylated with 2.29 parts by weight of ethylene oxide to yield a pasty brown material.

EMULSIFIER NO. 5

This emulsifier is a commercial product designated Tween–40. It is a polyoxyethylene (20) sorbitan monopalmitate, which is clear, light amber in color, and is water soluble.

EMULSIFIER NO. 6

This emulsifier is a commercial product designated Triton QS–15. It is an oxyethylated sodium salt, containing both anionic and cationic centers. The material is an anhydrous, water-soluble liquid.

EMULSIFIER NO. 7

This is a commercial product designated Hodag SVO–9. It is best described as Polysorbate 80, which is an all-vegetable base ester. The ester is a water-soluble yellow liquid.

The following emulsifier is not oxyalkylated, i.e., the starting material was not reacted with ethylene oxide, propylene oxide, etc., or with any material which would produce a polyether linkage, which is characteristic of oxyalkylated materials.

to incorporate the oily phase into the emulsion. As the amount of material in the mixture increases, mixing action is more efficient and further additions are made more rapidly. When the mixer will no longer produce an emulsion with no free oily phase, the limit of the emulsion is considered to have been reached.

In general, the best emulsifier is selected by preparing a family of related emulsifiers and testing them for effectiveness in the particular oily nonoily system under consideration. For example, a nonoily soluble base is oxyalkylated with propylene oxide (PrO) or butylene oxide (BuO) until it becomes just oil soluble and selected members are tested. An oil soluble base may be reacted with ethylene oxide (EtO) until it is nonoily soluble and similarly tested to select the optimum emulsifier.

A test, such as outlined in Example 77 of Ser. No. 302,177, filed Aug. 14, 1963, may be used on any other test that accurately reflects the proposed method of preparing the desired emulsion. The results of the test are then plotted on a multidimensional noncommutative composition space that represents the family of materials being used. Such tests and plots reveal the existence of an optimum performance region in the composition space.

The following examples illustrate the preparation of nonaqueous emulsions of this invention. These emulsions were prepared in the manner of Example 77 of Ser. No. 302,177, except the particular nonoily phase specified is employed in place of water specified in Example 77.

To save repetitive details the emulsions prepared herein are outlined in the following table.

TABLE II

| | External phase | | Internal phase | |
|---|---|---|---|---|
| | Material, ml. | Emulsifier, ml. | Material, ml. | Volume percent of total emulsion |
| Emulsion No.: | | | | |
| 1 | Dimethyl sulfoxide, 9.75 | No. 1, 3.25 | JP. 4, 490 | 97.42 |
| 2 | do | do | Kerosine, 490 | 97.42 |
| 3 | Ethylene glycol, 8.35; Methanol, C.P., 5.80 | No. 1, 2.60; No. 2, 0.65 | do | 96.55 |
| 4 | Ethylene glycol, 7.40; Methanol, C.P., 12.60 | No. 7, 2.47 | Kerosine, 490 | 95.6 |
| 5 | Dimethyl acetamide, 11.25 | No. 3, 3.75 | JP. 4, 155 | 91.9 |
| 6 | Ethylene glycol, 16.12 | No. 1, 4.03; No. 2, 1.35 | JP. 4, 750 | 97.13 |
| 7 | Ethylene glycol, 8.35; Methanol, C.P., 5.80 | No. 1, 2.60; No. 2, 0.65 | JP. 4, 490 | 96.55 |
| 8 | Ethylene glycol, 8.25; Ethanol, C.P., 7.80 | No. 1, 2.60; No. 2, 0.65 | JP. 4, 490 | 94.75 |
| 9 | Dimethyl sulfoxide, 5.50; Ethylene glycol, 2.75 | No. 1, 2.75 | JP. 4, 510 | 97.89 |
| 10 | Ethylene glycol, 7.40; Methanol, 12.60 | No. 7, 2.47 | JP. 4, 490 | 95.6 |
| 11 | Ethylene glycol, 12.36; Methanol, 5.028 | No. 6, 2.112 | JP. 4, 500 | 96.24 |
| 12 | Dimethylsulfoxide, 9.75; Methanol, C.P., .25; Ethylene glycol, 4.00 | No. 5, 4.00 | JP. 4, 695 | 97.47 |
| 13 | Nitromethane, 2.07; Methanol, C.P., 8.93; Ethylene glycol, 7.21 | No. 1, 2.24; No. 2, 0.56 | JP. 4, 500 | 96.0 |
| 14 | Nitromethane, 2.07; Methanol, C.P., 12.92; Ethylene glycol, 7.21 | No. 1, 2.24; No. 2, 0.56 | Kerosine, 520 | 95.4 |

EMULSIFIER NO. 8

This is a quaternary ammonium salt dissolved in an aqueous media. The salt itself is oxydiethylene bis(alkyldimethylammonium chloride), alkyl derived from coconut oil fatty acids. The solution is light amber in color and is water soluble.

In general, the emulsion is prepared by taking a small amount, such as about 10 volume parts, of the nonoily phase and mixing it with 2–4 parts by volume of the emulsifier. With efficient mixing, the oily phase is slowly added in small amounts allowing the mixer ample time The above examples describe essentially non aqueous emulsions. In certain instances it may be desirable to add a small amount of an aqueous component to the emulsion whether in the form of water itself or a solution of other components in water such as acid, bases, etc. The following examples are presented as illustrations of such emulsion systems.

The percent of water in the total emulsion of the following examples is minor, for example about 1–2% or less, for example, about 1% or less and may in certain instances be extremely small such as 0.5 to 0.1% or less.

TABLE IIA

| | External phase | | Internal phase | |
|---|---|---|---|---|
| | Material, ml. | Emulsifier, ml. | Material, ml. | Volume percent of total emulsion |
| Emulsion No.: | | | | |
| 15 | Dimethyl formamide, 7.50<br>Ammonium hydroxide, conc., 2.70 | No. 2, 1.25<br>No. 4, 1.25 | JP. 4, 490 | 97.47 |
| 16 | Ethylene glycol, 2.69<br>Dimethyl formamide, 5.37<br>Methanol, C.P., 3.57<br>Water, 2.69 | No. 2, 1.34<br>No. 4, 1.34 | JP. 4, 490 | 96.64 |
| 17 | Dimethyl acetamide, 9.75<br>Ammonium hydroxide, conc., 8.00 | No. 2, 1.625<br>No. 4, 1.625 | JP. 4, 490 | 95.9 |
| 18 | Dimethyl formamide, 5.00<br>Ethylene glycol, 2.50<br>Methanol, 5.78<br>Water, 5.42 | No. 8, 6.30 | JP. 4, 480 | 95.0 |
| 19 | Dimethyl formamide, 7.50<br>Ammonium hydroxide, conc., 2.70 | No. 2, 1.25<br>No. 4, 1.25 | Kerosine, 490 | 97.47 |
| 20 | Dimethyl acetamide, 9.75<br>Ammonium hydroxide, conc., 8.00 | No. 2, 1.25<br>No. 4, 1.25 | Kerosine, 490 | 95.9 |

Although the fact that the essential absence of water in these emulsions minimizes problems such as freezing, corrosion, bacterial and related actions, etc., which avoid the use of certain additives to correct these problems, such additives may be employed where the problems persists or where one deems it desirable to employ such additives.

These emulsions can also be prepared on a continuous basis by following the procedure described in Ser. No. 411,103, filed Nov. 13, 1966 which in essence comprises (1) preparing a preformed emulsion of approximately the same character as the desired emulsion, (2) introducing with sufficient agitation into the preformed emulsion the internal and external phases of the emulsion in such proportions so as to produce the desired emulsion, and (3) withdrawing the emulsion at the desired rate.

By following the procedure described in Ser. No. 411,103 and substituting the nonoily components described herein in place of water, one can prepare the present emulsions.

The emulsions of the present invention possess the following advantages.

(1) Nonadhesive.—They tend not to stick to the sides of the container. Thus "hold up" in fuel tanks is minimized.

(2) Viscosity.—The apparent rest viscosity is greater than 1000 cps., generally in the range of 10,000–100,000 or greater. However, under low shear, they will flow with a viscosity approaching that of the liquid phases. On removal of shear, the recovery to original apparent rest viscosity is nearly instantaneous. The hysteresis loop is very small.

(3) Temperature stability.—Increased temperature has little effect on viscosity until the critical stability temperature is reached at which point the emulsion breaks into its liquid components. This permits a wide temperature range of operation.

(4) Shear stability.— Emulsion may be subjected repeatedly to shear without degradation so long as the critical shear point is not reached. At this point the emulsion breaks. However, the critical shear point is sufficiently high to permit pumping at high rates.

(5) Quality control.—With these emulsions it is easy to reproduce batches with identical properties due to the absence of any "gel" structure.

(6) Metering, heat transfer, and nozzle spray characteristics.—Since emulsions can be broken with high shear, this can be done at the turbopump, giving completely liquid flow from that point on. This will permit metering by conventional means and will preclude laminar flow with attendant reduction of heat transfer capability, resulting in completely liquid nozzle flow and combustion characteristics.

(7) Solid loading.—Emulsions will flow well even with high solids loading since they have a broad range between rest viscosity and viscosity under modest shear.

In contrast to very high volume percent solid loading in gels or slurries which result in a "putty," these emulsions can suspend such solids in the internal phase while allowing the external phase to govern "flowability."

(8) Recovery of oily phase.—When gelling agents are dissolved in the fuel, distillation is required to recover the original component. With emulsions, application of high shear or high temperature to break the emulsion, and a subsequent decantation or drawoff operation, is all that is required. This is significant in considering a storable weapon system. tI would be a simple matter to exhaust a missile, break the fuel emulsion, and remake it periodically as required.

In some applications it may be desirable to be able to break the emulsion and reclaim the original phases. In such cases advantage may be taken of the effect of extremely high shear. For instance, thickened fuels of the type encompassed by this invention are easier to transport and less subject to evaporation, ignition, and spillage than fuels in conventional form. Due to their thixotropy they may be pumped without difficulty. They may be broken back to the original fuel by passing through a nozzle and allowing the small amount of aqueous phase to settle out. This is not true of gels which have been made from soaps and other materials currently used for such purposes.

Fuels prepared by the practice of this invention also have utility in applications where the sloshing of fuels in storage tanks is a problem. Since the fuels are pumpable and yet viscous they may be used in liquid fuel rockets and jets, where the shift of weight concomitant with a sudden change in direction will seriously affect the trim of the vessel. The reduced tendency to splash and shift lessens the need for elaborate bulkheads and allows more payload.

In summary, the emulsions of this invention have an apparent rest viscosity of about 1,000 to 100,000 or more cps. such as 25,000 to 100,000 or more, for example, 40,000–100,000, but preferably 50,000–100,000 cps. Emulsions have been prepared having apparent rest viscosities of about 10,000, 20,000, 30,000, 40,000, 50,000, 60,000, 70,000, 80,000, 90,000, 100,000 or greater.

This invention also comprises an emulsion consisting of a minor amount of an external phase and a major amount of an internal phase having a finely divided combustible solid dispersed within it. The choice of the solid is dictated primarily by specific impulse considerations. The usual practice of this invention would be to select a combination of liquid fuels and finely divided solids which are mutually nonreactive at storage temperatures and which yield potentially the maximum specific impulse. Specific impulse can be defined by the following equation.

The expression for specific impulse ($I_{sp}$), and the equations which lead to it are as follows (Ft=total impulse in lb.-sec. and F=mc./g.):

$$I_{sp} = Ft/W = F/m = c/g$$

$$c = \sqrt{2_g R' \frac{T_c}{M} \frac{\gamma}{\gamma-1}\left[1-\left(\frac{p_e}{p_c}\right)^{\gamma-1/\gamma}\right]}$$

$$Isp = \frac{1}{g}\sqrt{2_g R' \frac{T_c}{M} \frac{\gamma}{\gamma-1}\left[1-\left(\frac{p_e}{p_c}\right)^{\gamma-1/\gamma}\right]}$$

$$I_{sp} = 9.8\sqrt{\frac{T_c}{M}\frac{\gamma}{\gamma-1}1-\left(\frac{p_e}{p_c}\right)^{\gamma-1/\gamma}}$$

where $I_{sp}$=Specific impulse, pounds of thrust per pound weight of propellant burned per second.
F=Thrust, lb.
t=Duration of thrust due to burning, sec.
W=Total weight of propellant, lb.
m=Weight of propellant burned per second, lb./sec.
c=Effective exhaust velocity of propellant gases, ft./sec.
$V_e$=Actual exhaust velocity of propellant gases in the case of rockets (but not for air-breathing jets), ft./sec.
g=Acceleration due to gravity, ft./sec.$^2$.
R'=RM=Universal gas constant, 1544 ft.-lb./(lb.-mole) (°F.).
R=Gas constant per pound weight of propellant gases, ft.-lb./(lb.)(°F.).
$T_c$=Combustion chamber temperature, °R.
M=Average molecular weight of propellant gases.
$\gamma = C_p/C_v$.
$C_p$=Heat capacity of propellant gases at constant pressure, B.t.u./(lb.)(°F.).
$C_v$=Heat capacity of propellant gases at constant volume, B.t.u./(lb.)(°F.).
$P_e$=Pressure of propellant gases at nozzle exit, p.s.i.
$P_c$=Pressure of propellant gases in combustion chamber, p.s.i.

Having selected the best available combination fuels and solids and having calculated the optimum proportion of solids and fuels to be used, one selects a liquid for the external phase that is nonreactive with either the fuel or the finely divided solid, is immiscible with the fuel, and not a solvent for the solid fuel. Using the methods detailed elsewhere in these specifications, one then selects an appropriate emulsifier for the system. This emulsifier is then dissolved or dispersed in the external phase liquid and the mixture of solid and liquid fuels mixed into this liquid by any of the methods elsewhere described.

Examples of combustible solids elements which are of interest when combined with appropriate liquid fuels are lithium, beryllium, boron, carbon, sodium, magnesium, aluminum, silicon, etc. The hydrides or nitrides of the above elements, when they are solids, may be employed. These are employed as finely divided solids, for example a particle size of less than about 200 microns, such as less than about 100 microns, for example from about 0.5 to 50 microns, but preferably from about 1 to 10 microns.

The amount of finely divided solids added to the fuel can vary widely, such as from about 5 to 200 g. or more per 100 volumes of emulsions, for example from about 10 to 180, preferably from about 15 to 140, but usually from about 20 to 120.

The following examples are presented in non-limiting examples which illustrate the practice of this invention in which finely divided solids are employed.

EXAMPLE A

To the mixing bowl of the Model 3–C Kitchen Aid was added 9.75 ml. of the external phase of Example 2 of Table 1 and 3.25 ml. of Emulsifier No. 1. This mixture was then stirred until it became homogeneous. Four hundred ninety ml. of kerosine was then added slowly, while stirring. The result was a smooth, hazy, viscous emulsion. This was divided into two equal parts. Eighty grams of powdered aluminum was stirred into one half of the emulsion, resulting in a thick grey composition. Both the emulsion with the aluminum and the emulsion without the aluminum were equally stable.

EXAMPLE B

A similar emulsion was prepared in the manner of Example A except that the external phase used consisted of 8.35 ml. ethylene glycol and 5.80 ml. methanol (C.P.). The emulsifiers used were 2.60 ml. of Emulsifier No. 1 and 0.65 ml. of Emulsifier No. 2. The internal phase consisted of 490 ml. of kerosine and 80 grams of powdered aluminum.

EXAMPLE C

A similar emulsion was prepared in the manner of Example A except that the materials used were 7.40 ml. of ethylene glycol and 12.60 ml. of methanol (C.P.) (Emulsion No. 4). The emulsifier used was 2.47 ml. Hodag SVO–9 (Polysorbate 80). Eighty grams of powdered aluminum was employed.

EXAMPLE D

A similar emulsion was prepared in the manner of Example A except that the materials used were 7.50 ml. dimethylformamide and 2.70 ml. concentrated ammonium hydroxide of Emulsion No. 19. The emulsifiers used were 1.25 ml. of Emulsifier No. 2 and 1.25 ml. of Emulsifier No. 4. Eighty grams of powdered aluminum were employed.

EXAMPLE E

A similar emulsion was prepared in the manner of Example A except that the materials used were 9.75 ml. of dimethyl acetamide and 8.00 ml. concentrated ammonium hydroxide of Emulsion No. 20. The emulsifiers used were 1.25 ml. of Emulsifier No. 2 and 1.25 ml. of Emulsifier No. 4. Eighty grams of powdered aluminum were employed.

EXAMPLE F

A similar emulsion was prepared in the manner of Example A except that the materials used were 2.07 ml. nitromethane, 8.93 ml. methanol (C.P.), and 7.21 ml. ethylene glycol. The emulsifiers used were 2.23 ml. of Emulsifier No. 1 and 0.56 ml. of Emulsifier No. 2. Fifty grams of powdered aluminum were employed.

EXAMPLE G

A similar emulsion was prepared in the manner of Example D, except that 10 grams of carbon black were employed in place of 80 grams of powdered aluminum.

EXAMPLE H

A similar emulsion was prepared in the manner of Example A except that a small portion of boron was employed in place of 80 grams of powdered aluminum.

The above examples are employed to illustrate the preparation of the emulsions of this invention containing combustible powdered solids which can be employed in jet and rocket fuels. However, it should be understood that powdered aluminum and other powdered solids can be similarly added to other emulsions prepared in accord with this invention, for example the emulsions described in the specific examples disclosed herein.

The emulsions of this invention can be employed in both mono-propellant and polypropellant systems. The emulsion can be employed to suspended oxidizing agents in the fuel. For example, an inorganic oxidizing agent such as a nitrate or a perchlorate may be incorporated therein in varying amounts.

One can readily prepare emulsions containing about 20% by volume of such oxidizers as nitrates, such as lithium nitrate, potassium nitrate, or hydrazine nitrate and the like, perchlorates, chlorates, chlorites, hypochlorites, dichromates, chromates and persulfates, such as the potassium, sodium and ammonium salts. Salts of other metals such as calcium, magnesium, aluminum and the like may also be employed.

The propellant mixture can comprise the fuel components containing finely divided oxidizers in proportions preferably such that the fuel is present in molal excess i.e. and excess in the amount which would be consumed by the oxidizer in the propellant mixture would be from about 50–90% of that which would be required for complete combustion of the fuel although when desired proportions of oxidizer above the 90% can be employed, e.g., 100%.

The oxidizers may be of the formula $MA_Y$ where M is the cation such as $NH_4$ or a metal and Y represents the valency of M. The metal can be one of the metals of Group 1–A, 1–B, II–A, III–A, IV–A, and VIII of the Periodic Table of elements.

For example to use perchlorates as an example $$M(ClO_4)_x$$

the perchlorates can be alkaline metal perchlorates such as the lithium, sodium, potassium, cesium, etc. perchlorates; magnesium, calcium, barium, iron, silver, thalium, etc. perchlorates.

Little is to be gained by a detailed description of the jet and rocket engines in which compositions of this type are burned. Recent details of the construction of such engines are not generally available due to security restrictions. A general description of the operation of rocket and jet engines is given in Encyclopedia of Chemical Technology, published by Interscience Publishers (1951), vol. 6, pages 954–959 under "Jet Propulsion Fuels" and in vol. 11, pages 760–778 under "Rocket Propellants."

A short description of the operation of jet engines is given in the same publication on page 954, and of rocket engines on pages 766–767 thereof and elsewhere. Since the compositions of this invention may be pumped and handled in the same manner as liquids they are used in the same types of engines as conventional liquid fuels. They possess the unique advantages of high density (due to the incorporated solids), stability, restartability, and high specific impulse.

Having thus described my invention what I claim as new and desire to obtain by Letter Patent is:

1. A nonaqueous thixotropic oily phase-in-nonoily phase emulsion fuel comprising:
    (1) an emulsifiable oily phase selected from the group consisting of:
    animal oils, vegetable oils, mineral oils, resin oils and wood distillates, oils obtained from petroleum products, synthetic organic esters, and natural organic esters,
    (2) a nonaqueous nonoily phase selected from the group consisting of:
    ethylene glycol, diethylene glycol, propylene glycol, and dipropylene glycol, and
    (3) an emulsifying agent, said emulsifiable oily phase being the internal phase and at least 80% by volume of the total emulsion, said emulsion having the characteristics of a solid when at rest and the characteristics of a liquid when a force is exerted upon it, said emulsion tending to be nonadhesive, said emulsion having a critical shear point sufficient to permit pumping at high rates, and said emulsion having an apparent rest viscosity greater than about 1000 cps.

2. The thixotropic emulsion of claim 1, also including finely divided combustible solids.

3. The emulsion of claim 1 wherein said oily phase is present therein in an amount of at least 90% by volume of the emulsion.

4. The thixotropic emulsion of claim 3, also including finely divided combustible solids.

5. The thixotropic emulsion of claim 1 where the oily phase is a hydrocarbon.

6. The thixotropic emulsion of claim 2 where the oily phase is a hydrocarbon.

7. The thixotropic emulsion of claim 3 where the oily phase is a hydrocarbon.

8. The thixotropic emulsion of claim 4 where the oily phase is a hydrocarbon.

9. The emulsion of claim 5 wherein the nonaqueous nonoily phase is ethylene glycol.

References Cited

UNITED STATES PATENTS

| | | | |
|---|---|---|---|
| 2,873,182 | 2/1959 | Kosmin | 44—51 |
| 2,920,948 | 1/1960 | Weeks | 44—51 |
| 2,927,849 | 3/1960 | Greblick | 149—22 |
| 3,095,334 | 6/1963 | Scurlock | 149—21 |
| 3,105,747 | 10/1963 | Calhoun et al. | |
| 3,212,866 | 10/1965 | McCoy | 44—51 |
| 3,346,494 | 10/1967 | Robbins et al. | 44—51 XR |
| 3,352,109 | 11/1967 | Lissant | 60—217 |
| 3,396,537 | 8/1968 | Lissant et al. | |

BENJAMIN R. PADGETT, Primary Examiner

U.S. Cl. X.R.

44—7, 51; 60—219; 149—18, 44, 87